Aug. 31, 1948.　　　C. F. PETERSON　　　2,448,119
BOAT TRAILER
Filed Oct. 7, 1946　　　　　　　　　　　2 Sheets-Sheet 1
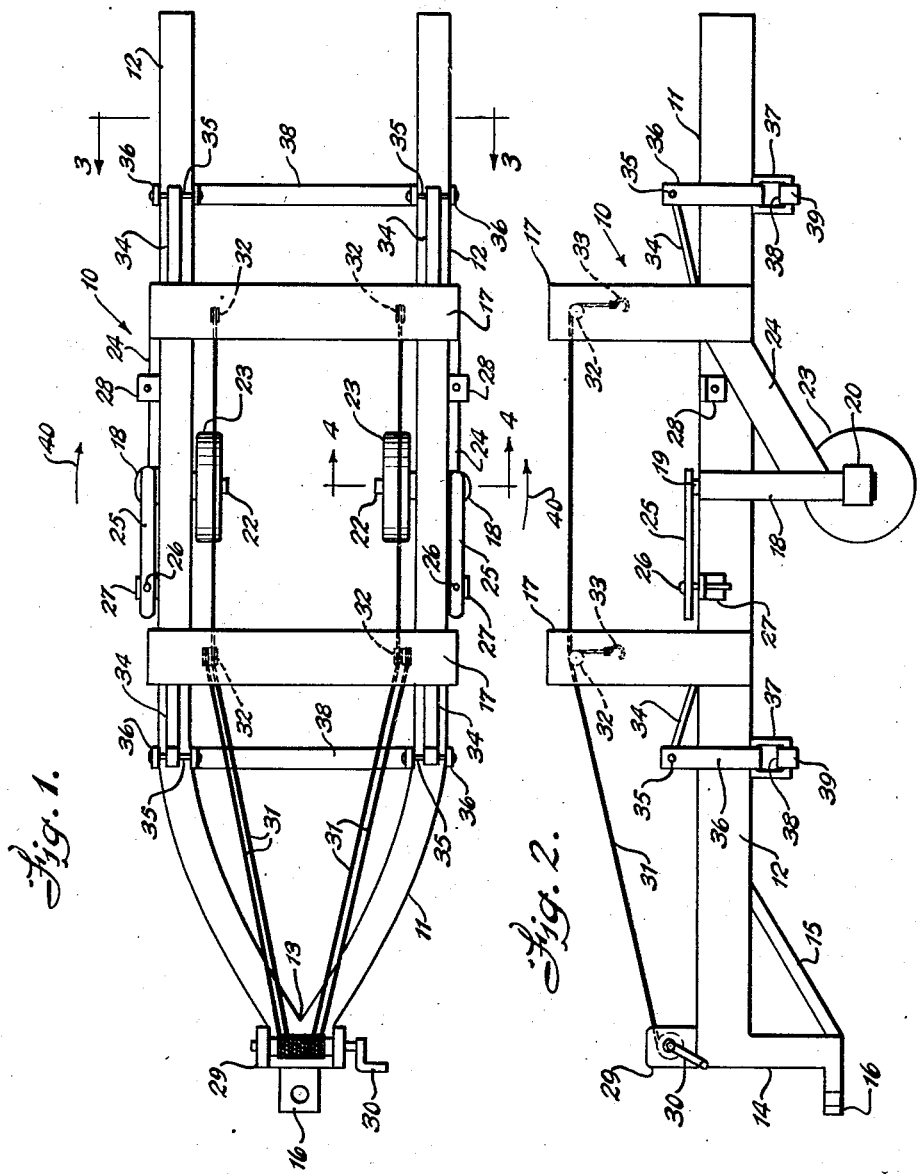
Inventor
Clarence F. Peterson.
By Clarence A. O'Brien
and Harvey B. Jacobson
Attorneys Aug. 31, 1948.　　　C. F. PETERSON　　　2,448,119
BOAT TRAILER
Filed Oct. 7, 1946　　　　　　　　　　　　　2 Sheets-Sheet 2

Inventor
Clarence F. Peterson.

By Clarence A. O'Brien
and Harvey B. Jacobson
Attorneys

Patented Aug. 31, 1948

2,448,119

UNITED STATES PATENT OFFICE 2,448,119

BOAT TRAILER

Clarence F. Peterson, Filer, Idaho

Application October 7, 1946, Serial No. 701,749

2 Claims. (Cl. 214—75)

This invention relates to new and useful improvements and structural refinements in boat trailers, and the principal object of the invention is to provide a device of the character herein described, such as may be conveniently and effectively employed in association with automobiles, or the like, for pickup, transportation and delivery of boats.

A further object of the invention is to provide a boat trailer which embodies in its construction hoisting means for elevating the boat from the ground or water into its portable position.

Another object of the invention is to provide a boat trailer wherein the boat may be firmly secured in preparation for the transportation step, and from which the boat may be readily released when so desired.

A still further object of the invention is to provide a boat trailer which is simple in construction and operation, and which will readily lend itself to economical manufacture.

With the above more important objects in view, and such other objects as may become apparent as this specification proceeds, the invention consists essentially of the arrangement and construction of parts as illustrated in the accompanying drawings, in which:

Figure 1 is a top plan view of the invention,

Figure 2 is a side elevation thereof;

Like characters of reference are used to designate like parts in the specification and throughout the several views.

Figure 3:
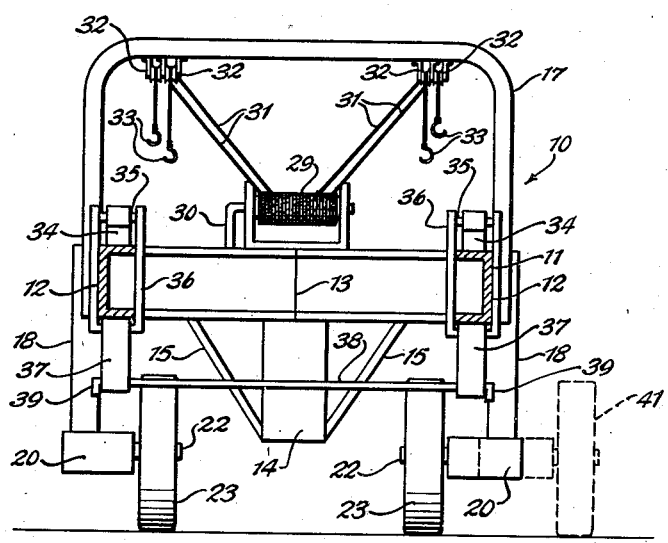
Figure 3 is a cross-sectional view, taken substantially in the plane of the line 3—3 in Figure 1.

Referring now to the accompanying drawings in detail, the invention consists of a boat trailer designated generally by the reference character 10, the same embodying in its construction a chassis 11 consisting of a pair of spaced, substantially parallel side members 12. The forward end portions of these side members are inwardly arcuated to a point of convergence, as at 13, where they are rigidly secured together. At this point, the chassis is equipped with a downwardly extending leg 14, braced as at 15, the lower end of the leg extending forwardly to provide a hitching tongue 16, whereby the trailer may be conveniently connected to an automobile, or the like. The leg 14 will, of course, also function as an effective support for the forward end of the trailer, when the invention is not in use.

A pair of inverted U-shaped cross members 17 are secured in a spaced relationship to the side members 12, the mid-portions of the cross members being elevated with respect to the side members, as will be clearly apparent from the accompanying drawings.

Figure 4:
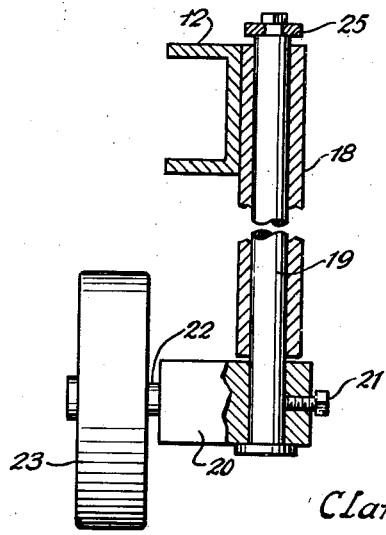
Figure 4 is a cross-sectional view, taken substantially in the plane of the line 4—4 in Figure 1.

A pair of upright tubular sockets 18 are also secured to the side members 12 medially the length of the latter, and a pin 19 is rotatably positioned in each of these sockets, as is best shown in Figure 4. An axle block 20 is secured to the lower end portion of each of the pins 19 by means of a suitable set screw 21, the blocks 20 being provided with laterally extending stub shafts 22 on each of which a road wheel 23 may be rotatably mounted.

It will be also noted that the sockets 18 are reinforced by means of the struts 24 secured to the afore-mentioned side members 12.

The upper ends of the pins 19 carry suitable levers 25, the free ends of which are formed with apertures to receive locking pins 26. These pins are selectively receivable in further apertures provided in pairs of angle brackets 27, 28 secured to the side members 12.

A winch 29, operated by a crank handle 30, is secured to the forward end portion of the chassis 11, and two pairs of hoisting cables 31 are associated with the winch for simultaneous winding or unwinding. The cables 31 pass over suitable pulleys 32 provided on the underside of the elevated portions of the cross members 17, as is best shown in Figure 1. The free end of each of the cables 31 is equipped with a hook 33 and it will be noted that the hoisting means thus formed provides four points of suspension, that is, two on each of the cross members 17.

Pairs of leaf springs 34 are also secured to the side members 12, each of said springs carrying at its free end a shackle pin 35 which connects together the free end portions of a substantially U-shaped hanger 36. One of these hangers is associated with each of the springs 34, the hangers being freely suspended from the springs and straddling, so as to speak, the adjacent of the side members 12. Each of the hangers 36, in turn, carries a depending eye or shackle 37, the eyes being aligned transversely of the chassis 11 in pairs, as will be clearly apparent from the accompanying drawings. Each of a pair of struts 38 is formed at the ends thereof with downturned detents 39, each of said struts being removably receivable in a pair of the transversely aligned eyes 37, as is best shown in Figure 3. It will be noted that the detents 39 will retain the strut in the eyes, yet the strut may be readily removed there-from by simply lifting the same upwardly, so as to disengage the detents from the eyes.

When the invention is placed in use, the pins 26 are withdrawn from the brackets 27 and the levers 25 are rotated in the direction of the arrows 40, so that the pins 26 may be engaged with the brackets 28. When this engagement has been accomplished, the wheels 23 will be disposed on the outside of the side members 12, as indicated at 41.

The trailer may now be passed over the boat (not shown) resting on the ground and it will be noted that the configuration of the chassis conforms substantially to the outline of the boat, so as to form what may be referred to as a cradle therefor. If the boat is resting in water, such as between two piers, the tread of the projected wheels 23 may be sufficiently wide to facilitate the passage of the trailer over the boat, with each wheel riding on one of the piers.

The hooks 33 are then attached to the boat in any suitable manner and the boat as a whole is raised by manipulating the winch 29. When the boat has been elevated to a sufficient extent, the struts 38, which heretofore were removed, may be positioned in the hanger eyes 37, as shown in Figure 3. Thereupon, the winch 29 is again manipulated so as to lower the boat onto the struts 38, which will then support the boat while the strain on the cables 31 is relieved.

By virtue of the suspension provided by the springs 34 and the associated hangers, the boat will be resiliently supported with respect to the chassis 11, thus safeguarding against road shocks while the trailer is in motion.

It should be added that after the boat has been raised to its elevated position and deposited upon the struts 38, the levers 25 are again manipulated so as to engage the pins 26 with the brackets 27 and to return the wheels 23 to their inner positions, as shown in the drawings. While in this position, the tread of the wheels conforms to substantially the wheel tread of the vehicle by which the trailer is drawn.

It is believed that the advantages and use of the invention will be clearly understood from the foregoing disclosure and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. A boat trailer comprising a chassis including spaced side members and forming a cradle for a boat, wheels carrying said chassis, leaf springs mounted on said side members, substantially U-shaped hangers suspended from said springs and straddling said side members, a depending eye carried by each of said hangers, and boat supporting struts extending transversely of said chassis, each of said struts being provided with detents at its ends and the end portions thereof being removably receivable in a pair of said eyes.

2. The device as defined in claim 1 together with upright tubular sockets secured to said side members, pins rotatable in said sockets and provided with laterally projecting stub shafts to accommodate said wheels, swingable levers secured to said pins, brackets on said side members, and locking pins receivable in said brackets and said levers for releasably retaining said wheels in predetermined relative positions with respect to said chassis.

CLARENCE F. PETERSON.

REFERENCES CITED

The following references are of record in the file of this patent:

UNITED STATES PATENTS

| Number | Name | Date |
| --- | --- | --- |
| 7,227 | Sipe | July 18, 1876 |
| 1,437,967 | Fitch | Dec. 5, 1922 |
| 1,531,180 | Erickson | Mar. 24, 1925 |
| 2,296,611 | Green | Sept. 22, 1942 |
| 2,388,870 | Sackett | Nov. 13, 1945 |
| 2,425,252 | Larson | Aug. 5, 1947 |

FOREIGN PATENTS

| Number | Country | Date |
| --- | --- | --- |
| 758,279 | France | Oct. 23, 1933 |